US005840407A

United States Patent [19]

Futhey et al.

[11] Patent Number: 5,840,407

[45] Date of Patent: Nov. 24, 1998

[54] OPTICAL FILM TO SIMULATE BEVELED GLASS

[75] Inventors: John A. Futhey, Port Townsend, Wash.; Douglas C. Sundet, Hudson, Wis.

[73] Assignee: Minnesota Mining and Manufacturing Co., St. Paul, Minn.

[21] Appl. No.: 428,564

[22] Filed: Apr. 25, 1995

[51] Int. Cl.[6] ........ B32B 3/28

[52] U.S. Cl. ........ 428/167; 428/142; 428/192; 428/212

[58] Field of Search ........ 428/167, 172, 428/81, 120, 156, 192, 212, 343, 542.2

[56] References Cited

U.S. PATENT DOCUMENTS

| | | | |
|---|---|---|---|
| 1,345,792 | 7/1920 | McAvoy | 428/167 |
| 2,162,590 | 6/1939 | Richter et al. | 88/105 |
| 3,420,730 | 1/1969 | Ellefson | 161/38 |
| 3,438,838 | 4/1969 | Pellicer et al. | 161/5 |
| 3,869,106 | 3/1975 | Gregov | 248/345.1 |
| 3,908,056 | 9/1975 | Anderson | 428/142 |
| 4,068,441 | 1/1978 | Shaffer | 52/308 |
| 4,127,689 | 11/1978 | Holt | 428/38 |
| 4,129,671 | 12/1978 | Greenberg | 428/48 |
| 4,154,880 | 5/1979 | Drennan | 428/38 |
| 4,192,905 | 3/1980 | Scheibal | 428/80 |
| 4,312,688 | 1/1982 | Brodis et al. | 156/63 |
| 4,318,946 | 3/1982 | Pavone | 428/34 |
| 4,335,170 | 6/1982 | Butler | 428/38 |
| 4,438,165 | 3/1984 | Butler | 428/38 |
| 4,488,919 | 12/1984 | Butler | 156/153 |
| 4,495,739 | 1/1985 | Drennan | 52/308 |
| 4,518,446 | 5/1985 | Drennan | 52/308 |
| 4,619,850 | 10/1986 | Charlton | 428/38 |
| 4,748,062 | 5/1988 | Menjo et al. | 428/46 |
| 4,814,213 | 3/1989 | Thorn | 428/34 |
| 4,842,904 | 6/1989 | Swarovski | 428/28 |
| 4,904,513 | 2/1990 | De Nicolo | 428/46 |
| 4,933,218 | 6/1990 | Longobardi | 428/38 |
| 4,997,687 | 3/1991 | Carter | 428/34 |
| 5,098,760 | 3/1992 | Fletcher | 428/46 |
| 5,227,220 | 7/1993 | Biedermann | 428/172 |
| 5,260,114 | 11/1993 | Smith, Jr. | 428/161 |

FOREIGN PATENT DOCUMENTS

| | | | |
|---|---|---|---|
| 3-256735 | 11/1991 | Japan | B32B 3/30 |

OTHER PUBLICATIONS

"Warner–Crivellaro Stained Glass, Inc.—Supply Catalog" (15 pages).

*Primary Examiner*—Donald Loney

[57] ABSTRACT

A transparent optical film made of a polymeric material has a first smooth surface and a second structured surface for providing a simulated beveled appearance. The structured surface of the film is formed of a plurality of spaced parallel grooves, each groove being formed by a first facet which is substantially perpendicular to the first smooth surface and a second facet which makes an angle between 1 to 60 degrees with the first smooth surface. The film may be affixed to glass, the adhesive applied to the first smooth surface or the second structured surface, to simulate beveled glass. Further, a leaded glass appearance or beveled mirror appearance may be simulated by vapor coating the optical film.

14 Claims, 6 Drawing Sheets

OPTICAL FILM TO SIMULATE BEVELED GLASS

FIELD OF THE INVENTION

The present invention generally relates to microstructured transparent optical film. In particular, the present invention relates to improvements in microstructured transparent optical films applied to glass or mirrors for decorative purposes. The optical film, when applied to glass or mirrors, refracts the transmitted light to give the appearance of cut beveled glass.

BACKGROUND OF THE INVENTION

Cut beveled glass is used for decorative purposes in a variety of applications, for example, in windows, doors and tables. Cut beveled glass, however, is expensive due to the substantial labor required. For glass manufacturers, it is necessary to use thicker, and therefore more expensive, glass when manufacturing cut beveled glass to ensure the outside edge of the bevel meets minimum standards of thickness. Moreover, it is virtually impossible for typical consumers of glass to cut a bevel in a pane of glass. Therefore, it would be desirable for consumers and glass manufacturers to produce high quality simulated beveled glass that was easy and inexpensive to produce the beveled effect in the glass. Further, it would be desirable if the beveled effect could be produced without removing the glass from its frame and the beveled effect could be removed or changed when desired.

Tempered glass is widely used in buildings for both commercial and residential applications. Tempered glass is hard and brittle, however, and is difficult to machine a bevel on the edge of the glass. Therefore, it is also desirable to be able to produce an inexpensive simulated beveled edge for tempered glass.

U.S. Pat. No. 4,192,905 to Scheibal describes a transparent strip of polymeric material used to imitate a beveled edge. The transparent strip has a wedged-shaped cross-section, the wedge shape having an angle similar to a beveled edge. The transparent strip has adhesive on one side for affixing the strip to the glass, thereby producing a beveled edge appearance. While the wedge-shaped strip may be placed with the thinner edge on the outside edge of the glass, it produces a sharp ridge on the inner edge of the strip. If the wedge-shaped strip is place with the thicker edge on the outside edge of the glass, however, incident light is refracted in the opposite direction as compared to real beveled glass.

Microstructured transparent optical film has been used on glass, mirrors, vehicles, signs, ceilings and other surfaces for decorative purposes. For example, commonly-assigned U.S. Pat. No. 3,908,056 to Anderson describes an optically decorative web that produces a real or virtual image which image is other than that of an actual surface of the strip. The Anderson optically decorative web comprises a strip of opaque or transparent polymeric material having a series of ridges and grooves on one side and a smooth surface on the other side. Examples of real or virtual images produced by the optically decorative web Anderson discloses are metallic or transparent concave or convex surfaces, an arched ceiling which would be concave, giving the sensation of being in a room having a domed ceiling, a metallic strip on an automobile, molding on furniture, or the appearance of a semicylindrical glass or metallic bar extending across a glass panel.

Cut or textured glass shapes, having beveled edges, are frequently assembled together in decorative patterns using lead or brass came. The process of cutting the glass shapes and assembling the shapes using the lead came is expensive and requires considerable skill and time. The process to create different textures on glass varies, depending on the texture. For example, glue chip texture is achieved by the application of animal glue to the sandblasted surface of glass. The glue is exposed to heat and allowed to dry, thereby chipping the surface of the glass to produce the textured surface.

SUMMARY OF THE INVENTION

To overcome the limitations in the prior art described above, and to overcome other limitations that will become apparent upon reading and understanding the present specification, the present invention provides a transparent optical film for providing a simulated beveled appearance. The polymeric film has a first smooth surface and a second structured surface. The structured surface has a plurality of spaced parallel grooves, each groove being formed by a first facet, which is substantially perpendicular to the smooth surface, and a second facet, which makes an angle with the smooth surface such that light rays entering the smooth surface behave similarly to light rays entering the actual cut beveled glass. The present invention further provides a polymeric film having a first portion and a second portion, the first portion having a structured surface simulating beveled glass and the second portion simulating textured glass.

BRIEF DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

Figure 1:
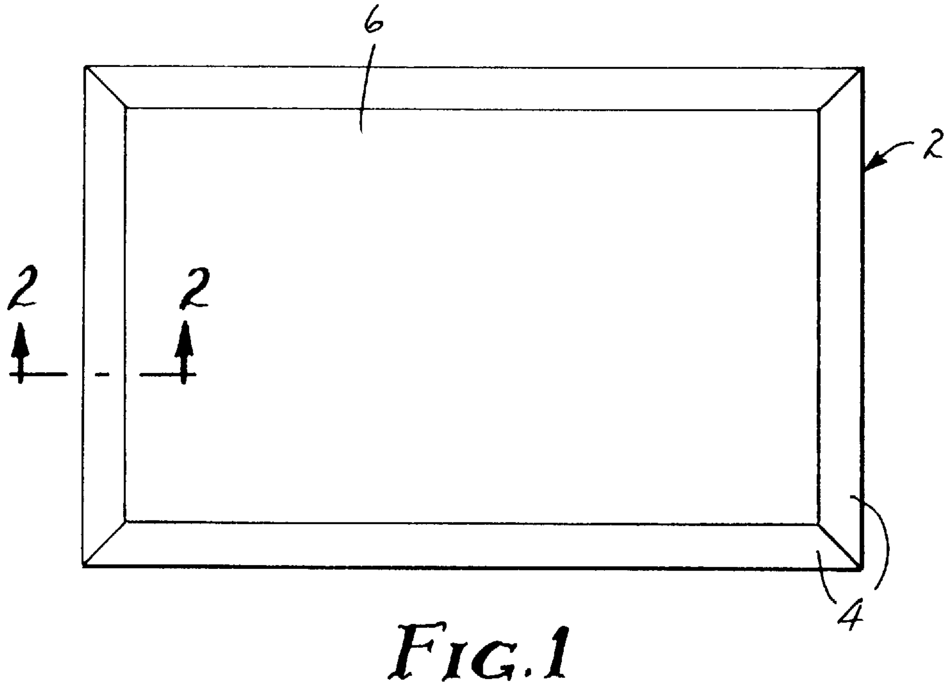
FIG. 1 is a top view of a sheet of beveled glass.
Figure 2:
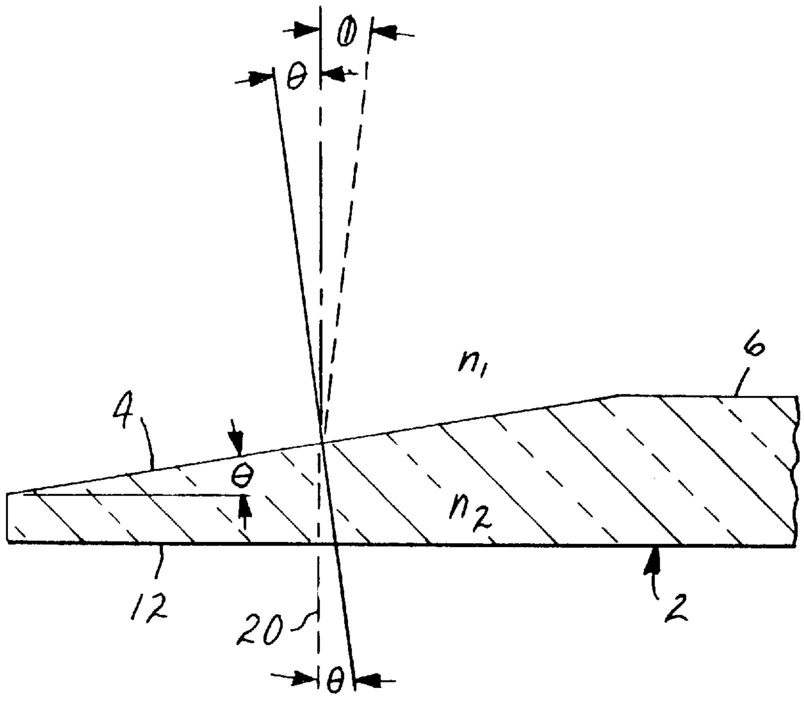
FIG. 2 is an enlarged sectional view of the beveled portion of cut beveled glass taken along line 2—2 of FIG. 1 used to describe the behavior of the refracted light rays.

To overcome the limitations in the prior art described above, and to overcome other limitations that will become apparent upon reading and understanding the present specification, the present invention provides an optical film for application to a sheet of glass that simulates the appearance of beveled glass. Moreover, the present invention provides a simple, economical way to customize doors, windows, mirrors and other glass objects by applying simulated beveled and/or textured shapes made from embossed or molded polymers over existing glass surfaces. FIG. 1 shows a rectangular sheet of beveled glass 2, having bevel 4 on the edges of glass 2. Beveled glass 2 has a center portion 6, where a perpendicular ray of light is not refracted at the glass/air interface. At bevel 4, however, incident light entering the glass at the bottom of the bevel is refracted as it exits glass 2. Referring to FIG. 2, a cross-sectional view of bevel 4 at the edge of glass 2 is shown. Bevel 4 is cut at an angle θ to bottom surface 12 of glass 2. Angle θ varies depending on the desired effect of the bevel and the use of the beveled glass, although it typically is in the range of 5 to 45 degrees. For example, in FIG. 2, bevel 4 is used as decorative edging on a sheet of glass, and angle θ is 10 degrees. When light ray 20 enters glass 2 from bottom surface 12, the deflection angle ϕ of light ray 20 as it exits the glass medium may be measured from a normal to bottom surface 12 of glass 2. The refractive index of air and glass are represented by $n_1$ and $n_2$, respectively. Typical numbers for the refractive indices of air and glass, respectively, are:

$$n_1=1.0 \quad n_2=1.5$$

Using these parameters and Snell's law:

$$n_1 \sin(\theta+\phi)=n_2 \sin\theta$$

the deflection angle ϕ may be determined to be approximately 5 degrees.

Figure 3:
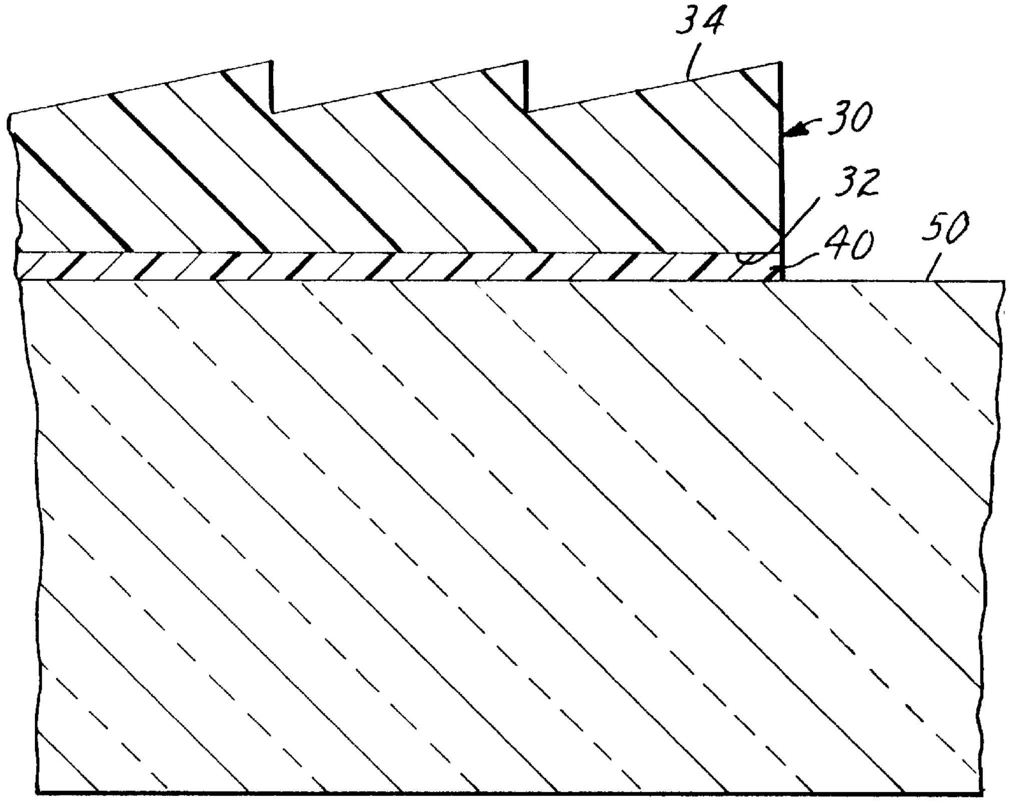
FIG. 3 is a side cross-sectional view of a first embodiment of the present invention, where the film is affixed to the glass with the grooved side away from the glass.

To produce an optical film that will give the appearance of cut beveled glass when applied to a sheet of glass, the film must be optically clear. Further, the facets bending incident light, thereby producing the beveled appearance must be sufficiently small such that they will not be evident to a casual observer. Examples of suitable materials to produce the optical film of the present invention include cellulose acetate butyrate, polycarbonate, methylmethacrylate, polyvinylchloride and polystyrene. Referring to FIG. 3, a cross-sectional view of a portion of a sheet of glass with the optical film of the present invention applied to it is shown. Optical film 30 has smooth, planar first side 32 and second side 34 opposite first side 32. Second side 34 of optical film 30 has a plurality of prism grooves, preferably running parallel to the length of film 30. The grooved preferably are equally spaced. Optical film 30 is applied to the surface of glass 50 by transparent adhesive 40. Preferably, adhesive 40 is a pressure sensitive adhesive, such as SCW-100 transfer adhesive, Scotch brand 666 double coated tape and Scotch brand VHB transfer adhesive, all manufactured by Minnesota Mining and Manufacturing Company, St. Paul, Minn. In a preferred embodiment, adhesive 40 is applied to optical film 30 with a removable liner to produce an optical tape for easy application to a sheet of glass. In such an embodiment, the liner is removed and the optical tape is positioned over the area of the glass where the beveled effect is desired.

Figure 4:
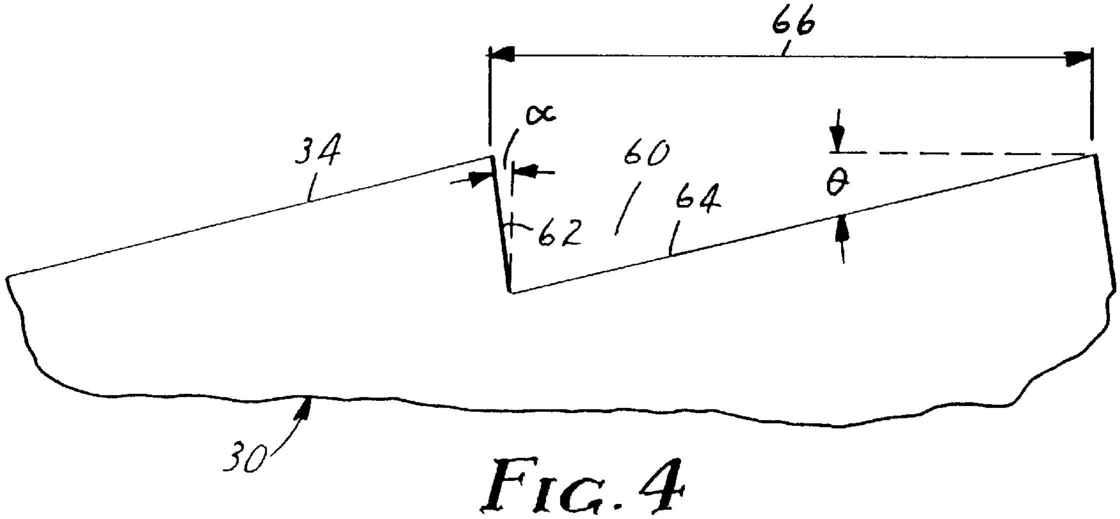
FIG. 4 is a side view of the grooves of the film for the first embodiment.

Referring to FIG. 4, the grooves and the facets defining the grooves will now be described. On second side 34 of optical film 30, a plurality of prism grooves 60 are defined by first substantially perpendicular facet 62 and second facet 64. First facet 62 is substantially perpendicular to planar first side 32 of optical film 30 and is defined by draft angle α. Draft angle α is theoretically zero degrees for an optimal beveled effect. In practice, however, draft angle α is greater than zero degrees for manufacturing ease, and preferably falls in the range between zero and seven degrees. The angle θ that defines second facet 64 is critical to the quality of the bevel effect produced by the optical film. To simulate the optical qualities of cut beveled glass, light rays entering perpendicular to planar first side 32 of optical film 30 and exiting second facet 64 must behave similarly to light rays that enter the planar side of cut beveled glass and exit out the beveled portion of the glass. Because the geometries of the cut beveled glass and the second facet 64 of optical film 30 are similar and because both glass and the polymeric materials used for the optical film have indices of refraction around 1.5, angle θ must be similar to the bevel angle in glass. As shown in FIG. 2, it is desirable for light rays to be deflected 5 degrees from the perpendicular when exiting the optical film to simulate a 10 degree bevel. Thus, to produce an exit angle of 5 degrees from the perpendicular for light rays entering perpendicular to the first planar side 32 of optical film 30, angle θ must also be approximately 10 degrees. The pitch 66 of the grooves, the distance between peaks of the grooves, preferably is sufficiently small such that an observer from a distance cannot discern the individual grooves. If the pitch 66 of the grooves is too small, however, the film exhibits diffractive scattering and color. As the groove spacing is made smaller, the color introduced by diffraction is maximized. This can enhance the decorative effect of the film, but diminishes the clarity of an object viewed through the bevel. Preferably, the pitch 66 of grooves 60 will range between five and 500 μm and more preferably, between 50 and 250 μm. For purposes of providing color by diffraction, however, the preferable pitch is between one and ten μm.

Figure 5:
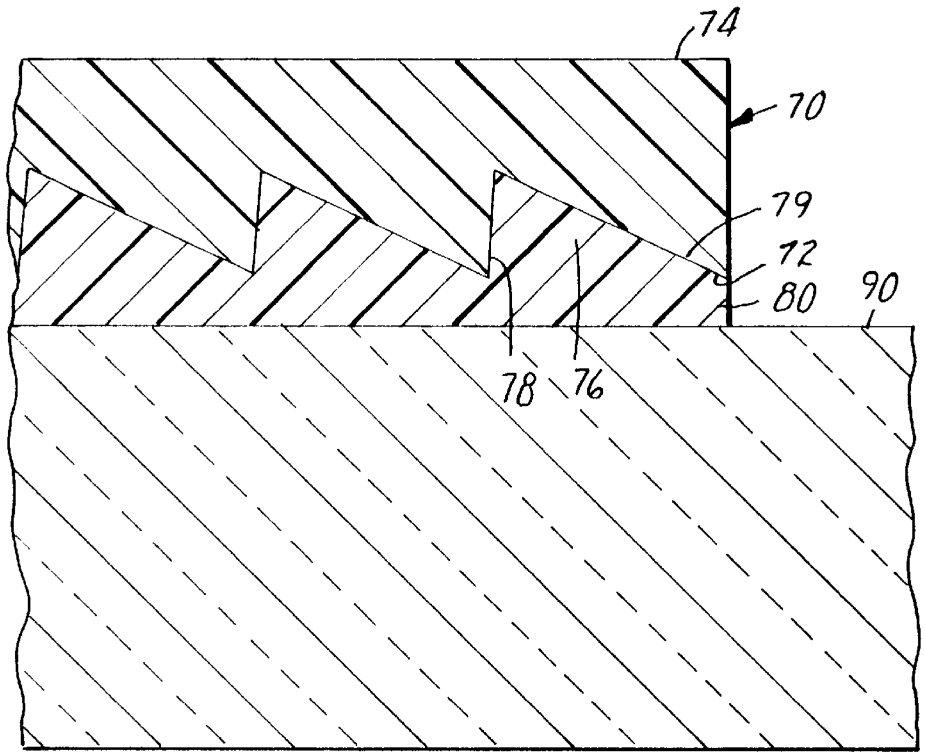
FIG. 5 is a side cross-sectional view of a second embodiment of the present invention, where the film is affixed to the glass with the grooved side facing the glass.

In the embodiment of the present invention shown in FIG. 3, the grooves of the optical film are exposed to the elements. This exposure can cause problems, as the peaks of the grooves are somewhat fragile and are prone to scratches that can eventually degrade the quality of the beveled appearance. Moreover, the grooves can fill with water, oil, dirt and other matter which can also degrade the optical quality of the beveled effect. Referring to FIG. 5, the cross-section of another embodiment of the present invention is shown which avoids the above-mentioned concerns. Optical film 70 is made of a substantially transparent polymeric material, preferably having a high index of refraction. Some preferred polymeric materials include polycarbonate, with an index of refraction of approximately 1.60 and polystyrene, with an index of refraction of approximately 1.59–1.60. Optical film 70 has a first surface 72 that has a plurality of parallel grooves 76, preferably running the length of optical film 70, each groove 76 being defined by a first facet 78 and a second facet 79. Optical film 70 has a substantially planar second surface 74 opposite first surface 72. Second surface 74 is the surface exposed to the elements, thereby providing a surface that is easily cleaned and protecting the peaks of the grooves. First facet 78 is substantially perpendicular to second surface 74, with a draft angle, as described for the previous embodiment, of between zero and seven degrees from the perpendicular. Second facet 79 is defined by angle θ, as will later be described.

Optical film 70 is affixed to glass 90 by adhesive 80. Adhesive 80 is substantially transparent and preferably has a low index of refraction. Some examples of adhesives to be used include silicone based adhesives such as Dow Corning Q2-7406, 280A, X2-7735, General Electric PSA 590, PSA 600, and PSA 610, which are polydimethyl siloxane based silicone pressure sensitive adhesives having an index of refraction approximately between 1.40 to 1.43. A preferred adhesive is a polydiorganosiloxane polyurea segmented copolymer-based composition. The composition is prepared as follows: Polydimethylsiloxane diamine (molecular weight 37,800) was fed at a rate of 7.92 g/min (0.000420 amine equivalents/min) into the first zone of a Leistritz (Leistritz Corporation, Allendale, N.J.) 8 zone, 18 mm diameter 720 mm length co-rotating twin screw extruder having double start fully intermeshing screws operating at 250 revolutions per minute. Silicate resin (SR-545, available from General Electric Silicone Products Division, Waterford, N.Y., the toluene from this solution as supplied having previously been evaporated) was fed at a rate of 9.1 g/min to the third zone of the extruder. A mixture of 30.65 parts methylenedicyclohexylene-4,4'-diisocyanate, 18.15 parts isocyanatoethyl metbacrylate, and 51.20 parts DAROCURE™ 1173 (a photoinitiator, available from EM Industries, Hawthorne, N.Y.) was fed at a rate of 0.154 g/min (0.000541 isocyanate equivalents/min) into the seventh zone. The temperature profile of the each of the 90 mm long zones was: zones 1 through 5–40° C.; zones 6 and 7–60° C.; zone 8–120° C.; and endcap–160° C. The resulting pressure-sensitive adhesive was extruded at 160° C. through a die and collected.

The preferred adhesive has an index of refraction of 1.43. Adhesive 80 must fill the grooves, leaving enough excess thickness for good adhesion. Therefore, a less viscous adhesive is preferable, as it flows better into the grooves, thereby eliminating any air pockets in the grooves. The preferred adhesive has a lower viscosity before UV curing and may be laminated to the grooves before curing to better fill the grooves without air entrapment. In one embodiment, after adhesive 80, a pressure sensitive adhesive, is applied to optical film 70, a removable liner is applied to the other side of adhesive 80 to form an optical tape.

Figure 8:
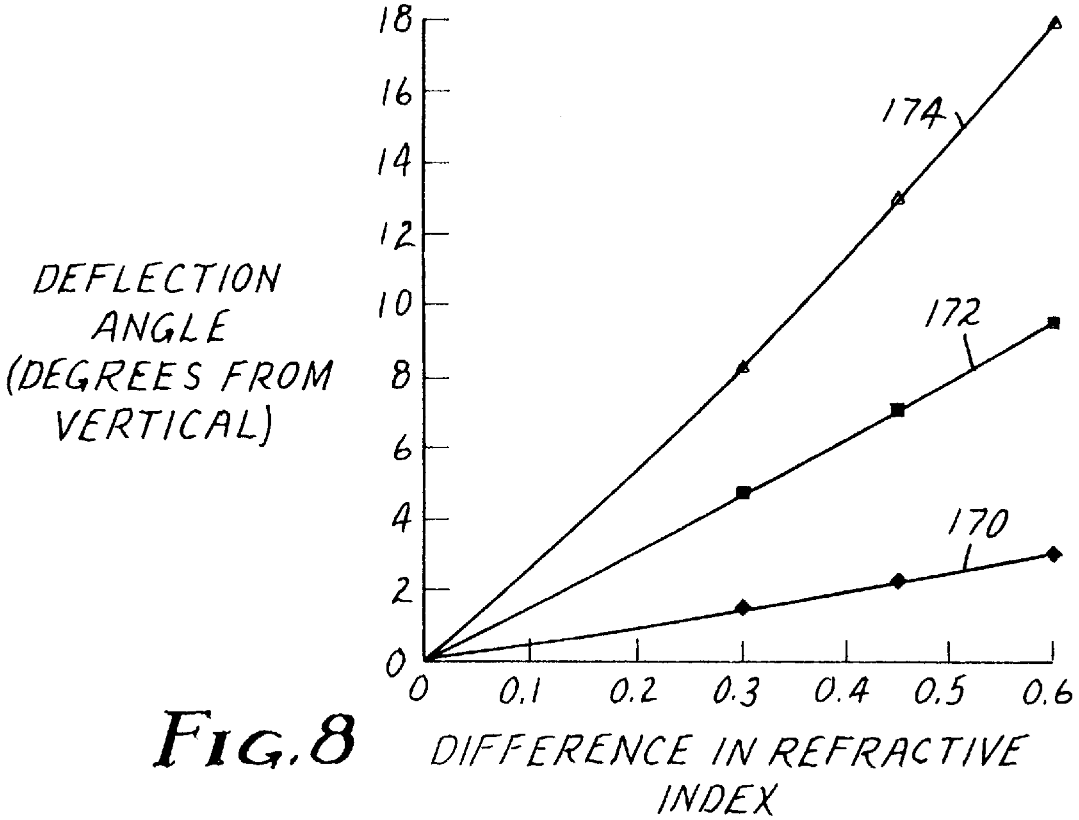
FIG. 8 is a graph showing the necessary difference in refractive indices between the film and air to achieve a deflection angle necessary to simulate various bevel angles.
Figure 9:
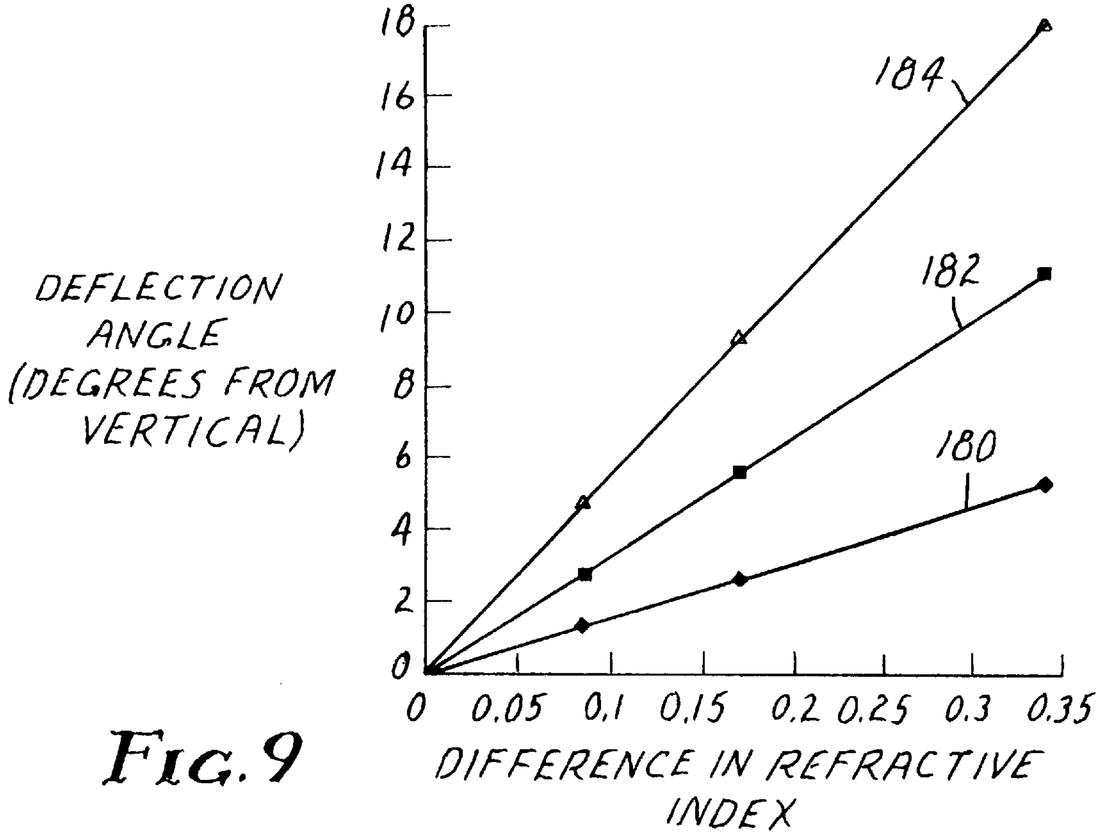
FIG. 9 is a graph showing the necessary difference in refractive indices between the film and the adhesive to achieve a deflection angle necessary to simulate various bevel angles.

While the absolute values of the index of refraction of the polymeric material used for the optical film and index of refraction of the adhesive or air are not critical, the differential of the values of the indices of refraction of the two is critical to produce the desired beveled effect. FIGS. 8 and 9 are graphs showing the deflection angle ϕ with respect to the differential in refractive indices between the optical film and air for a groove/air interface, such as the embodiment shown in FIG. 3, and between the optical film and adhesive for an embodiment where the grooves face the glass, such as the embodiment shown in FIG. 5. FIGS. 8 and 9 represent the relationship when the polymeric material has a refractive index of 1.6. The deflection angle is substantially the same for a range of refractive indices for the polymeric material, although as the refractive index approaches lower values, such as 1.3, the deflection angle gets smaller, and conversely, as the refractive index approaches larger values, such as 3.0, the deflection angle gets larger.

FIG. 8 is a graph showing the necessary differential in refractive indices between the optical film and air to produce desired deflection angles ϕ. The necessary differential is dependent on the physical angle θ of the grooves in the optical film, as shown by lines 170, 172 and 174 which represent the relationship between the differential and exit angle ϕ for physical angles θ of 5, 15 and 25 degrees, respectively. FIG. 9 is a graph showing the necessary differential in refractive indices between the optical film and adhesive to produce desired deflection angles ϕ. The necessary differential is dependent on the physical angle θ of the grooves in the optical film, as shown by lines 180, 182 and 184, which represent the relationship between the differential and exit angle ϕ for physical angles θ of 15, 30 and 45 degrees, respectively.

For example, for a physical angle θ of thirty degrees in an embodiment with adhesive on the grooved side of the optical film, to obtain an exit angle ϕ of five degrees, the differential between the refractive index of the film and the refractive index of the adhesive would need to be approximately 0.155. Thus, if a polymeric material having an index of refraction of 1.60 is used for the optical film, an adhesive having a refractive index of 1.445 would produce an exit angle of five degrees. Similarly, to obtain an exit angle of three degrees, a differential of approximately 0.09 would be necessary. Therefore, line 182 of FIG. 9 shows that differentials between 0.1 and 0.35 will produce exit angles between three and eleven degrees for a physical angle of thirty degrees. Those skilled in the art will readily recognize that the relationship between the physical angle θ, the refractive index of the optical film and the refractive index of the adhesive can be varied to obtain the desired exit angle to emulate the exit angle from beveled glass having various physical angles.

Figure 6:
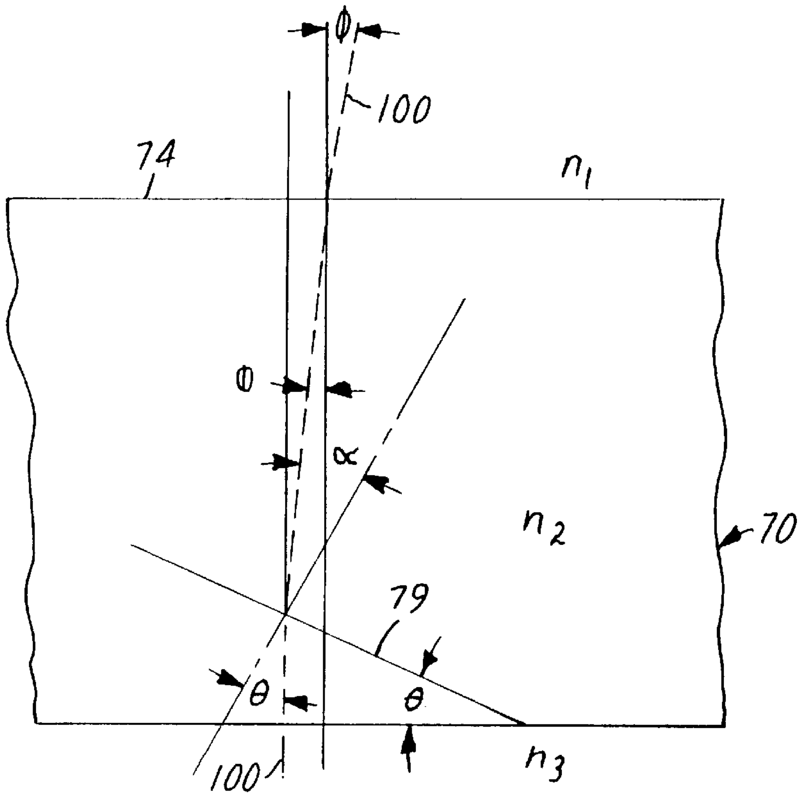
FIG. 6 is a side view of the grooves of the film for the second embodiment to help describe the behavior of refracted light rays.

Referring to FIG. 6, optical film 70 has a first grooved surface with second facet 79 defined by angle θ and has an index of refraction of $n_2$ and a second planar surface 74 at the film/air interface. The index of refraction of air is designated by $n_1$ and the adhesive, $n_3$. To produce an adequate beveled appearance with the adhesive applied to the first grooved surface of the optical film, the relationship between the indices of refraction of the polymeric material and adhesive, and the physical angle θ defining the grooves is significant. Referring back to FIG. 6, light ray 100 is refracted both at the adhesive/film interface as well as at the film/air interface. Snell's law at the first refraction, at the adhesive/film interface, is:

$$n_3 \sin\theta = n_2 \sin\alpha$$

where α is the intermediate angle as shown. Snell's law at the second refraction, at the film/air interface, is:

$$n_2 \sin(\theta-\alpha) = n_1 \sin\phi$$

Combining the two equations and eliminating the intermediate angle α gives the following relationship between the physical angle θ defining the grooves, and the indices of refraction of the air, film and adhesive:

$$\sin\theta\sqrt{1-\left(\frac{n_3}{n_2}\sin\theta\right)^2} - \frac{n_3}{n_2}\sin\theta\cos\theta = \frac{n_1}{n_2}\sin\phi$$

where ϕ is the angle of deflection of light ray 100 from a normal to the second planar surface of the optical film. The above relationship shows that as the difference between the index of refraction of the polymeric material of the film and the index of refraction of the adhesive gets larger, the physical angle θ can get smaller.

To produce a high quality beveled appearance with a particular bevel angle, the angle of deflection $\phi$ of a light ray entering the bottom of the glass should be similar to or the same as the angle of deflection in cut beveled glass. Further, to have a reasonable groove structure, that is, the physical angles are not so high that manufacturing the grooves and filling them with adhesive is not too difficult and the tape can be reasonably thin, the differential between the indices of refraction of the polymeric material of the optical film and the adhesive must be substantial. As shown in FIG. 2, for a bevel angle of 10 degrees, the angle of deflection $\phi$ is approximately 5 degrees. Polymeric material such as polycarbonate, polystyrene or some hybrid of either of these and other polymers will have an index of refraction of approximately 1.57. The aforementioned silicone adhesives have an index of refraction of approximately 1.42. Using these parameters, the physical angle $\theta$ defining the grooves will be approximately 28 degrees. This physical angle allows the tape to be reasonably thin. For example, if the groove pitch is 5 mils, or 0.1270 millimeters, then the groove depth would be 2.65 mils, or 0.0673 millimeters, and the total tape thickness could be approximately 5 mils, or 0.1270 millimeters. While the above example simulated a 10 degree bevel angle, a range of bevel angles can be simulated by varying the physical angle $\theta$ defining the grooves within the range of one to 60 degrees. In the embodiment with the grooves exposed, it is more preferable to have the physical angle $\theta$ in the range of 3 and 30 degrees and even more preferable to have the physical angle $\theta$ in the range of 7 and 20 degrees. In the embodiment with the planar side of the optical film exposed, it is more preferable to have the physical angle $\theta$ in the range of 10 and 55 degrees and even more preferable to have the physical angle $\theta$ in the range of 23 and 38 degrees.

In an embodiment where the adhesive is applied to the optical film and a strippable liner is applied to the adhesive to form an optical tape, it is desirable for the optical tape to be repositionable upon application to the glass for a short period of time to precisely align the glass and tape. One method of applying the optical tape to produce the repositionable property is to first apply a mixture of water, polypropyl alcohol and liquid detergent, such as a liquid dishwashing detergent, such as Joy, manufactured by Procter & Gamble, Cincinnati, Ohio, in an approximate ratio of 40:20:1. After cleaning the surface of the glass, the surface is wet with the liquid mixture. The liner is removed from the adhesive and the optical tape is placed on the wet glass. The liquid allows the optical tape to be easily slid around the surface of the glass until it is precisely in a desired location. The liquid will evaporate over time, such as overnight, and the optical tape will be permanently bonded to the glass. This method further reduces visual flaws, such as entrapped air between the bond lines, when the film is affixed to the glass.

Figure 7:
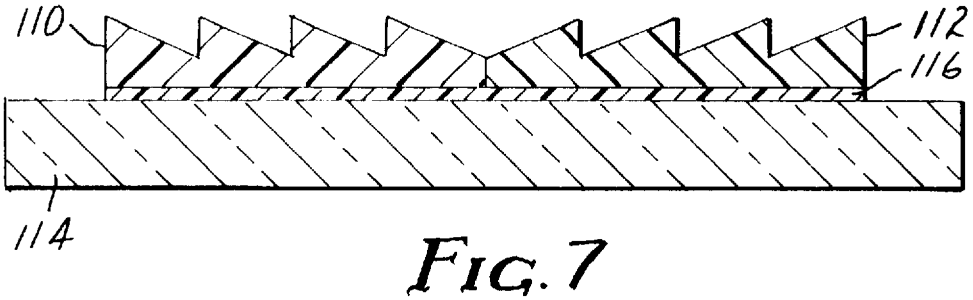
FIG. 7 is a side cross-sectional view of the present invention oriented on glass to produce a simulated V-groove.

While the present invention has been described to produce a beveled edge appearance on glass, the film also may be used to simulate a V-groove cut into glass. FIG. 7 shows the placement of two strips of optical film to create a V-groove cut effect. First optical film 110 and second optical film 112 are placed adjacent along their lengthwise direction, with grooves also running along the length of the film. Optical film 110 has the outer edge of its simulated bevel adjacent the outer edge of the simulated bevel of optical film 112 to create a V-groove appearance. Film 110 and 112 are affixed to glass 114 by adhesive 116.

Figure 10:
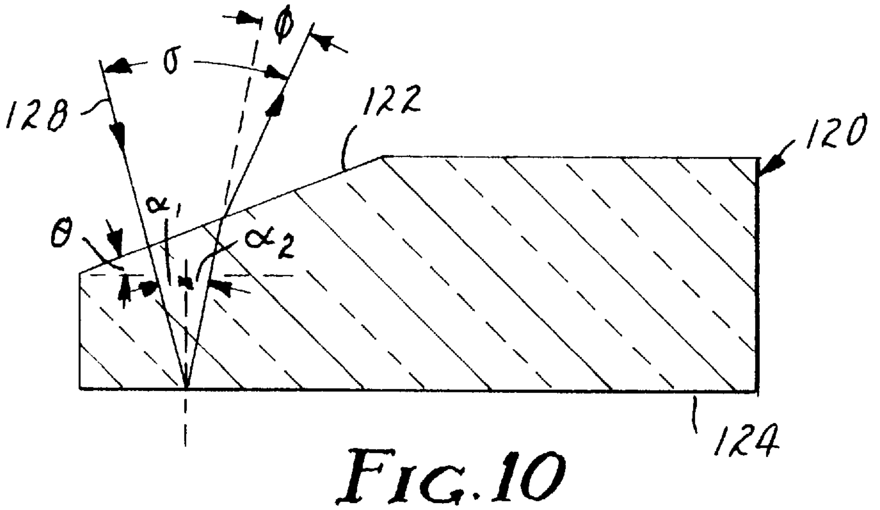
FIG. 10 is a side cross-sectional view of a beveled mirror to help describe the behavior of reflected and refracted light rays.
Figure 11:
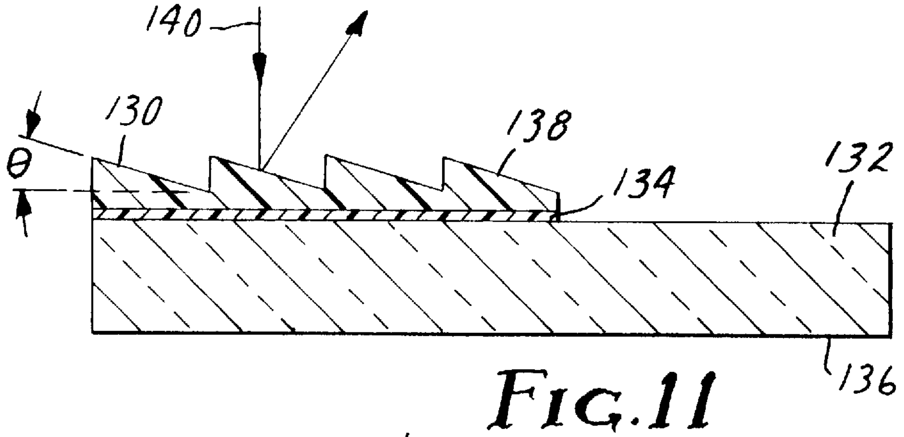
FIG. 11 is a side cross-sectional view of the present invention applied to a mirror, the film of the present invention having grooves facing away from the mirror.
Figure 12:
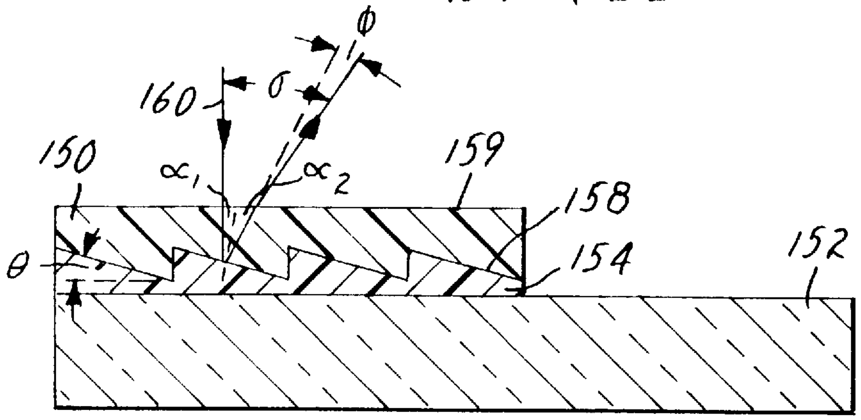
FIG. 12 is a side cross-sectional view of the present invention applied to a mirror, the film of the present invention having grooves facing the mirror.

Films with microstructured surfaces can also be used with mirrored surfaces to create a beveled appearance. When the transparent optical film described above is bonded to the surface of a mirror with the smooth side of the film affixed to the mirror, however, the film has a hazy appearance. FIGS. 11 and 12 show embodiments of the present invention for application to mirrored surfaces. FIG. 10 shows a cross-sectional view of a beveled mirrored surface. At mirrored surface 124 of mirror 120, light ray 128 is reflected, the angle of incidence $\alpha_1$ equal to the angle of reflection $\alpha_2$. Light ray 128 is refracted at beveled edge 122 having a physical angle of $\theta$, with an angle of deflection of $\phi$. The behavior of light ray 128 with respect to beveled edge 122 and mirrored surface 124 can be described by the following equations:

$$\sigma=2\alpha+\phi \qquad \text{(Equation 1)}$$

$$n_1\sin(\theta+\phi)+n_2\sin\theta; \qquad \text{(Equation 2)}$$

$$\alpha=\theta;\text{ and} \qquad \text{(Equation 3)}$$

$$\sigma=2\theta+\phi \qquad \text{(Equation 4)}$$

In FIG. 11, optical film 130 is applied to mirror 132 by adhesive 134. Mirror 132 has mirrored surface 136. To improve the beveled appearance of the transparent optical film, the grooved side of optical film 130 is vapor coated with a highly reflective metal 138, such as aluminum or silver. Thus, light rays 140 approaching optical film 138 are reflected at surface 138, the angle of incidence equaling the angle of reflection, thereby creating a beveled appearance. The angle of incidence and angle of reflection are each equal to the physical angle $\theta$. Another advantage of the vapor coat layer is that the adhesive beneath the vapor coat layer is invisible from view.

FIG. 12 shows a similar embodiment as FIG. 11, except the grooves of the optical film are facing the mirrored surface. Optical film 150 is applied to mirror 152 by adhesive 154. The grooved side of optical film 150 is vapor coated with highly reflective metal 158. Light ray 160 is reflected at vapor coat layer 158 and refracted at planar side 159 of optical film 160. The behavior of light ray 160 with respect to the embodiment of FIG. 12 is governed by Equations 1–4, shown above. In an embodiment with the grooved side of optical film 150 facing the mirrored surface, however, the vapor coating is not necessary, although it is preferred. In an embodiment where film 150 is not vapor coated, the optical effect of applying film 150 to mirror 152 is the appearance of a bevel with a larger angle than would appear if the same film were applied to glass, such as in FIG. 5, due to the double refraction of the light rays after they reflect off the surface of mirror 152.

Figure 13A:
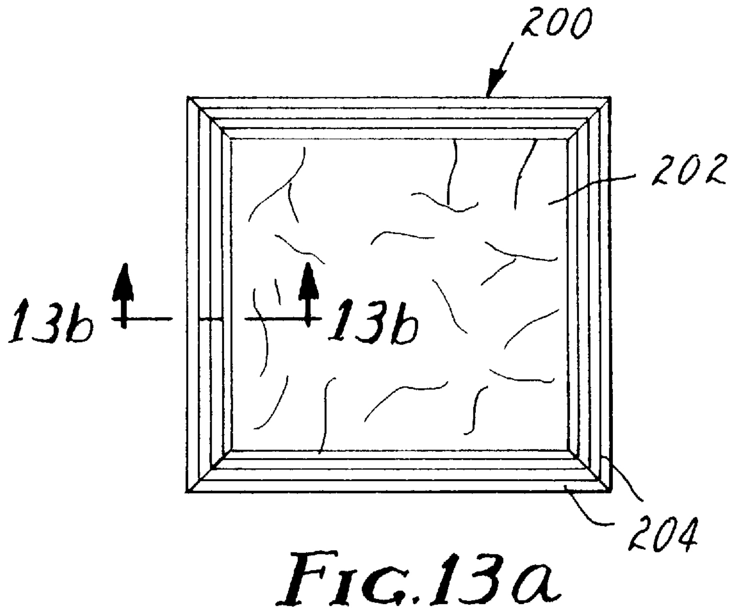
FIGS. 13*a* is a top view of another embodiment of the present invention, the film having a first portion simulating beveled glass and a second portion simulating textured glass.
Figure 13B:
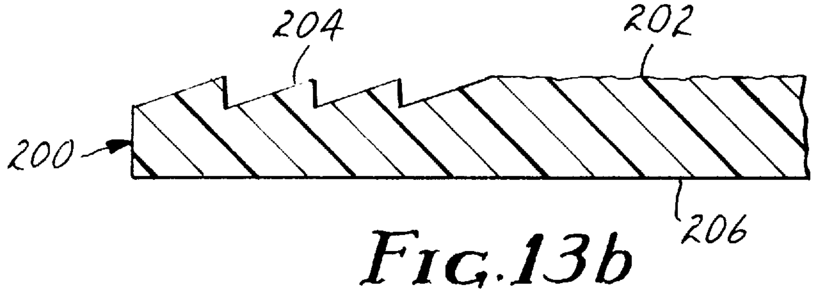
FIG. 13*b* is an enlarged sectional view taken along line 13*b*—13*b* of FIG. 13*a*.

Referring to FIG. 13*a* and 13*b*, a top view and a cross-sectional view of another embodiment of the present invention is shown. FIG. 13*a* shows film 200 simulating a cut glass shape, in FIG. 13*a*, a square, made of a polymeric material, such as plasticized polyvinyl chloride, polycarbonate, cellulose acetate butyrate, and methylmethacrylate. Film 200 has first side 206 and a second side opposite first side 206. Film 200 has a first portion having random textured surface 202 and second portion having structured surface 204 simulating a beveled edge. Random textured surface 202 is preferable on the second side opposite first side 206. Structured surface 204 may either be on the first side or the second side of film 200. Structured surface 204 has a plurality of prism grooves and facets oriented such that light rays entering perpendicular to planar side 206 of film 200 are refracted similarly to cut beveled glass. A more detailed description of structured surface 204 is given in conjunction with FIGS. 3–5. When structured surface 204 is on the second side of film 200, as shown in FIG. 13*b*, film 200 may be affixed to glass, not shown, with adhesive on first side 206, similar to the embodiment shown in FIG. 3. When structured surface 204 is on first side 206 of film 200, film 200 is affixed to glass with adhesive on structured surface 204, similar to the embodiment shown in FIG. 5. When the adhesive in on structured surface 204, it is preferable to orient structured surface 204 facing the glass and textured surface 202 away from the glass.

Textured surface 202 may be any of a variety of textures typically found on textured glass. Some examples of textures include ripple glass, having high and low spots of rippled or wormy texture, hammered glass, characterized by its circular hammered impressions on the surface, moss glass, having a fine gravelly texture, flemish glass, having wide high and low spots, glue chip glass, having fern-like texture and baroque, having a surface with raised wildly swirled texture. Textured surface 202 may be fabricated using a photochemical engraving process on a die, and embossing or molding the polymer in the die. Another method is by electroplating a piece of glue chip glass to obtain a mirror image of the glass. The electroformed stamper is used to emboss a sheet of methylmethacrylate with the glue chip pattern. To add the microstructured grooves to the simulated glass, a channel is milled into the methylmethacrylate around the perimeter and strips of microstructured film are inserted into the milled channel so that the surfaces are aligned. The fabricated master then is electroplated to obtain a stamper. This process produces a one-piece stamper by parqueting several pieces together. The stamper then can be used to emboss or mold the simulated beveled and textured glass.

The present invention can also simulate the appearance of leaded windows, where cut glass shapes having beveled edges are assembled together using lead or brass came. This decorative pattern is simulated by affixing the polymeric simulated cut glass shapes, as shown in FIGS. 13*a* and 13*b*, on the glass and affixing mircostructured stripping with a vapor coat layer to the glass to simulate lead or brass came. Referring back to FIG. 3, first side 32 of optical film 30 can be vapor coated with a highly reflective metal, such as aluminum or silver, to create the leaded appearance. Alternatively, referring back to FIG. 11, grooved side of optical film 130 can be vapor coated to produce the leaded appearance using reflective metal 138. FIG. 12 shows yet another embodiment of simulated lead came, where the grooved side optical film. 150 is vapor coated with metal 158.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

What is claimed is:

1. A window with a simulated beveled portion, said window comprising:

a pane of glass;

a polymeric film having a first smooth surface and a second structured surface said second structured surface being formed of a plurality of spaced parallel grooves, each said groove being formed by a first facet which is substantially perpendicular to said first smooth surface and a second facet which makes an angle between 1 to 60 degrees with said first smooth surface said film being affixed to said pane of glass and simulating a beveled appearance.

2. The transparent optical film according to claim 1, further comprising a layer of adhesive applied to said first smooth surface, said adhesive affixing said film to said pane of glass.

3. The transparent optical film according to claim 1, further comprising a layer of adhesive applied to said second structured surface, said adhesive affixing said film to said pane of glass.

4. The transparent optical film according to claim 2, wherein said second facet makes an angle between 3 and 30 degrees with said first smooth surface.

5. The transparent optical film according to claim 2, wherein said second facet makes an angle between 7 and 20 degrees with said first smooth surface.

6. The transparent optical film according to claim 2, wherein the index of refraction of said polymeric film is between 1.35 and 1.65.

7. The transparent optical film according to claim 3, wherein said second facet makes an angle between 10 and 55 degrees with said first smooth surface.

8. The transparent optical film according to claim 3, wherein said second facet makes an angle between 23 and 38 degrees with said first smooth surface.

9. The transparent optical film according to claim 3, wherein the index of refraction of said polymeric film is between 1.5 and 1.65 and the index of refraction of said adhesive is between 1.3 and 1.45.

10. The transparent optical film according to claim 3, wherein the index of refraction of said polymeric film is between 0.1 and 0.5 greater than the index of refraction of said adhesive.

11. A mirror with a simulated beveled portion, said mirror comprising:

a first mirrored portion having a reflective surface;

a polymeric film having a first smooth surface and a second structured surface, said second structured surface being formed of a plurality of spaced parallel grooves, each said groove being formed by a first facet which is substantially perpendicular to said first smooth surface and a second facet which makes an angle between 1 to 60 degrees with said first smooth surface and being coated with a reflective material said film being affixed to said mirror and simulating a beveled appearance.

12. A film for providing a simulated beveled glass and textured glass appearance, said film comprising a polymeric film having a first portion and a second portion, said first portion having a smooth surface and a structured surface, said structured surface being formed of a plurality of spaced parallel grooves, each said groove being formed by a first facet which is substantially perpendicular to said smooth surface and a second facet which makes an angle between 1 to 60 degrees with said smooth surface, said second portion having a textured surface structure and a smooth surface.

13. The film according to claim 12, further comprising a layer of adhesive applied to said smooth surface of said first portion and said second portion.

14. The film according to claim 12, further comprising a layer of adhesive applied to said structured portion of said first portion and said smooth surface of said second portion.

* * * * *